US012508613B2

(12) United States Patent
Marker

(10) Patent No.: US 12,508,613 B2
(45) Date of Patent: Dec. 30, 2025

(54) IMPREGNATING DEVICE AND METHOD

(71) Applicant: IMBOX PROTECTION A/S, Egå (DK)

(72) Inventor: René Marker, Auning (DK)

(73) Assignee: IMBOX PROTECTION A/S, Egå (DK)

( * ) Notice: Subject to any disclaimer, the term of this patent is extended or adjusted under 35 U.S.C. 154(b) by 0 days.

(21) Appl. No.: 18/037,135

(22) PCT Filed: Nov. 18, 2021

(86) PCT No.: PCT/DK2021/050339
§ 371 (c)(1),
(2) Date: May 16, 2023

(87) PCT Pub. No.: WO2022/105977
PCT Pub. Date: May 27, 2022

(65) Prior Publication Data

US 2024/0017282 A1 Jan. 18, 2024

(30) Foreign Application Priority Data

Nov. 18, 2020 (DK) ........................... PA 2020 70765

(51) Int. Cl.
*A43D 95/06* (2006.01)
*A43D 95/26* (2006.01)
(Continued)

(52) U.S. Cl.
CPC .............. *B05B 12/04* (2013.01); *A43D 95/26* (2013.01); *B05B 12/122* (2013.01);
(Continued)

(58) Field of Classification Search
None
See application file for complete search history.

(56) References Cited

U.S. PATENT DOCUMENTS 3,517,645 A * 6/1970 Klein, Jr. ............... A43D 95/06 118/301
5,180,606 A 1/1993 Stokes et al.
(Continued)

FOREIGN PATENT DOCUMENTS

CN 107913885 A 4/2018
CN 210138769 U 3/2020
(Continued)

OTHER PUBLICATIONS

International Search Report for PCT/DK2021/050339 mailed Mar. 9, 2022.
Written Opinion for PCT/DK2021/050339 mailed Mar. 9, 2022.

*Primary Examiner* — Binu Thomas
(74) *Attorney, Agent, or Firm* — Schmeiser, Olsen & Watts, LLP

(57) ABSTRACT

An apparatus and method are provided for applying a surface treatment such as impregnation agent or water repellency agent to shoes, boots, bags, gloves or the like, where the apparatus includes a closed treatment chamber provided with an openable access to the treatment chamber from outside the treatment chamber, and where the bottom of the treatment chamber a turntable is provided, having a flat surface in an x-y plane, and an axis Z, and where one or more nozzles are arranged for spraying a mist towards the turntable where the nozzles is/are connected to a control unit, and where a plurality of markers are provided on the periphery of the turntable, and that inside the treatment chamber a scanner used, such that the nozzles are activated to issue a mist of treatment according to a preprogrammed sequence and/or count of markers registered by the scanner.

19 Claims, 1 Drawing Sheet

Figure 1:
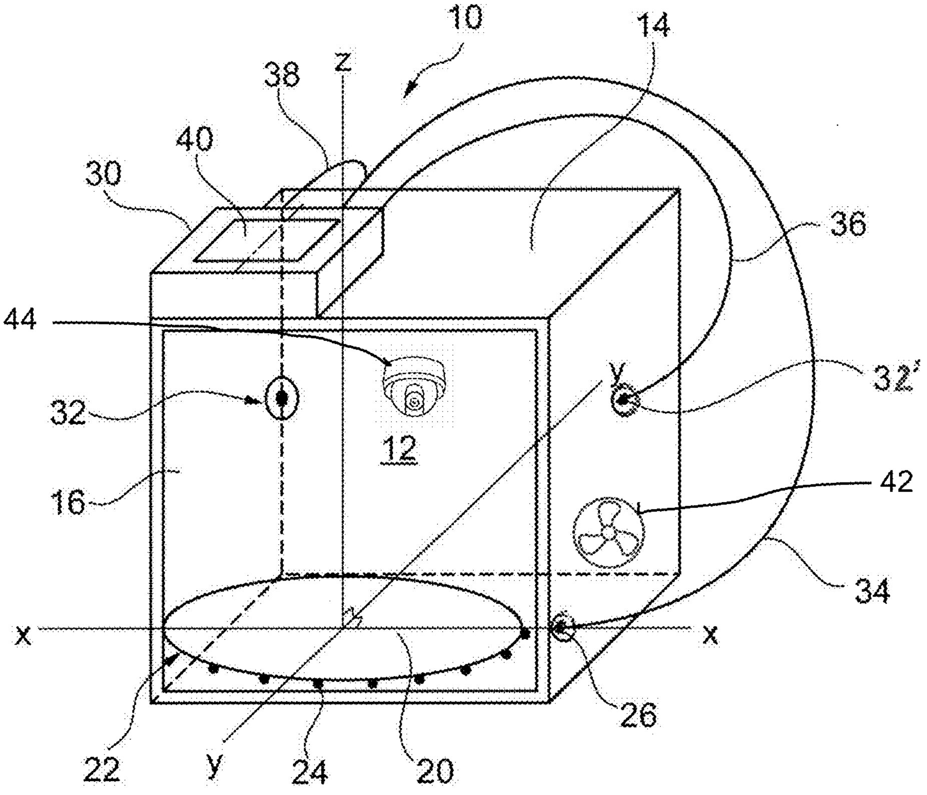

(51) Int. Cl.

| | |
|---|---|
| ***B05B 12/04*** | (2006.01) |
| ***B05B 12/12*** | (2006.01) |
| ***B05B 13/02*** | (2006.01) |
| ***B05B 16/00*** | (2018.01) |
| *A43D 11/00* | (2006.01) |
| *A43D 119/00* | (2006.01) |

(52) U.S. Cl.

CPC .......... *B05B 13/0242* (2013.01); *B05B 16/00* (2018.02); *A43D 11/003* (2013.01); *A43D 95/06* (2013.01); *A43D 119/00* (2013.01)

(56) References Cited

U.S. PATENT DOCUMENTS

| | | | | |
|---|---|---|---|---|
| 5,215,130 | A * | 6/1993 | Kojima ............... B05B 13/0242 141/105 | |
| 2009/0097039 | A1 | 4/2009 | Kawasaki et al. | |
| 2015/0138320 | A1 | 5/2015 | El Daher | |
| 2016/0037865 | A1 * | 2/2016 | Marker ................... B05B 12/02 118/313 | |
| 2020/0023401 | A1 * | 1/2020 | Pickworth ........... B05B 13/0242 | |
| 2020/0096316 | A1 | 3/2020 | Vinshtok et al. | |
| 2023/0115442 | A1 * | 4/2023 | Marker .................... A43B 7/12 12/70.5 | |
| 2023/0135517 | A1 * | 5/2023 | Small .................. B05B 13/0242 427/8 | |

FOREIGN PATENT DOCUMENTS

| | | | | |
|---|---|---|---|---|
| DE | 19945229 | A1 | | 8/2000 |
| DE | 10 2019 001423 | A1 | | 8/2020 |
| JP | H02 74230 | A | | 3/1990 |
| JP | H02274230 | | * | 3/1990 |
| RU | 2684085 | C1 | | 4/2019 |
| WO | 2009/127214 | A1 | | 10/2009 |
| WO | 2014/135166 | A1 | | 9/2014 |
| WO | 2016096019 | A1 | | 6/2016 |
| WO | 2020/023273 | A1 | | 1/2020 |

* cited by examiner

IMPREGNATING DEVICE AND METHOD

CROSS-REFERENCE TO RELATED APPLICATIONS

This application claims priority to PCT Application No. PCT/DK2021/050339, having a filing date of Nov. 18, 2021, which is based DK Application No. PA 2020 70765, having a filing date of Nov. 18, 2020, the entire contents both of which are hereby incorporated by reference.

FIELD OF TECHNOLOGY

The following is directed to an apparatus for applying a surface treatment such as impregnation or a water repellency agent to an item, as well as a method for carrying out the treatment in the apparatus. The items will typically be shoes, boots, bags, gloves, or the like, which may in a common referent be referred to as smallish wearable items.

BACKGROUND

The applicant of the following has for a long time been involved in the impregnation of smallish wearable items, in particular shoes, and has developed apparatuses such as published in WO2009/127214 and WO2014/135166. In these apparatuses the item to be treated, for example shoes, will be placed in a closeable chamber inside the apparatus. Once the door is closed the item to be treated is in a closed treatment chamber and the impregnation process will commence. The impregnation process comprises issuing a mist of impregnating liquid from nozzles arranged inside the chamber where the impregnation mist will impact the shoes to such a degree that an effective impregnation is achieved. At the same time, since the treatment takes place inside a closed treatment chamber, ventilation means are provided which together with suitable filtration units may assure that any harmful or dangerous constituents from the impregnation liquid, such as for example inorganic solvents are handled and treated properly, such that a treatment in an apparatus, according to any of these publications, is not harmful to the ambient environment.

RU2684085 describes an impregnating device where the items to be treated—typically shoes, are positioned on a platform. The platform may be rotated. A nozzle, in liquid communication with a reservoir, is arranged for spraying impregnating agent towards the item to be treated. On the opposite side of the items to be treated, relative to the nozzle a screen is arranged. The screen is intended to catch any impregnating agent not applied to the items to be treated. The nozzle is arranged such that it will not spray above/besides the screen, such that all surplus impregnating agent is caught by the screen.

The same applicant's prior devices had great success and do treat large numbers of particularly shoes with an impregnating agent in order to render the shoes resistant against ingress of moisture, water etc. However, one problem with all the prior devices is the fact that they use a substantial quantity of impregnating agent in order to achieve a sufficient treatment, where a large fraction of the impregnating agent is wasted, i.e., is not applied to the surface of the shoe as such, but ultimately ends up in the filter in the drain or on the screen. A further drawback of using too much impregnating agent in addition to having a more costly treatment, is also the fact that the drying process, i.e., the timespan from when the impregnating agent is applied to the surface of the shoe until the shoe is sufficiently dry such that it can be removed and worn by a user, is extended due to the excessive use of impregnating agent in order to assure that a thorough treatment of the item to be treated, particularly shoes, is achieved.

SUMMARY

An aspect relates to an apparatus and a method where the treatment of the smallish wearable item, such as particularly shoes, achieves a very good impregnating ability, and at the same time saves on impregnating agent, and furthermore also as a consequence, reduces the drying time such that the overall treatment cycle is reduced.

Embodiments of the invention address this by providing an apparatus for applying a surface treatment, such as impregnation agent or water repellency agent to an item, in particular shoes, boots, bags, gloves or the like, where the apparatus comprises a closed treatment chamber provided with an openable access feature providing access to the treatment chamber from outside the treatment chamber, and where in the vicinity of the bottom of the treatment chamber a turntable is provided, the turntable has a flat surface in a x-y plane, and furthermore that the turntable is rotatable around an axis Z orthogonal to the x-y plane, and where one or more nozzles are arranged inside the treatment chamber directed for spraying a mist towards the turntable where the one or more nozzles is/are connected to a control unit, and where a plurality of markers are provided on the periphery of the turntable, and that inside the treatment chamber a scanner for registering the markers is provided where input from the scanner is used as input to the control unit, such that the one or more nozzles are activated to issue a mist of treatment according to a preprogrammed sequence and/or count of markers registered by the scanner.

By providing a turntable inside the treatment chamber it is possible to rotate the items to be treated, for example shoes, relative to the nozzles issuing the treatment mist. Therefore, it is possible to assure that the items to be treated are more or less treated in an even manner regardless of which part of the item is in front of the nozzle. With the prior devices, where the nozzles are stationary, the nozzle angels and the provision of the impregnating mist were decisive in determining the success of the impregnating treatment. With the present arrangement, where the turntables rotate, the items will be treated relative to the nozzle as the item passes the nozzle(s). The successful treatment is easy to obtain in that there appears to be no blind angles during a treatment process where the item to be treated is rotated on the turntable.

Furthermore, by using a closed treatment chamber provided with, for example a door or where the treatment chamber is part of a drawer, it is possible to have a quite intensive treatment regime inside the treatment chamber without impregnating agent or water repellency agent being allowed to leak out to the ambient environment.

As the turntable is provided with markers along the periphery of the turntable and a scanner is arranged in order to detect and count the markers on the turntable, it is possible to identify the exact position of the turntable relative to the nozzles. By furthermore arranging the items to be treated, for example shoes, in determined positions for example by providing outlines of the shoes on the turntable, it is possible to activate the nozzles in response to the part of the shoe passing the nozzle as it is well-known, due to the interaction between the markers and the scanner, when a particular portion of the shoe will pass a particular nozzle.

Furthermore, in embodiments where more than one nozzle is installed inside the treatment chamber, it may be advantageous to activate the two or more nozzles at different times for various reasons. One reason may be that if a nozzle is arranged higher that the other nozzle and should be used for treating the shaft of a shoe, this nozzle will only be activated if a shaft is present on the shoe and when the shaft is in close proximity to the nozzle. This will further provide the advantage that the mist issued from the higher nozzle will not interfere with a mist issued from the lower nozzle or from a nozzle arranged elsewhere in the treatment chamber.

In a further embodiment of the invention, two or more nozzles are arranged inside the treatment chamber, where each nozzle is directed at different sections of the turntable.

With this embodiment it is achieved that the nozzles are designed to apply the treatment liquid, i.e., the impregnating agent or the water repellency agent, at different areas. As the turntable rotates the items to be treated, for example shoes, they will pass through the different sections exposed by the nozzles and thereby receive the treatment intended by the particular nozzle. Furthermore, it may be avoided that the mist issued from one nozzle interferes with the mist from another nozzle, both because of the different sections to which the nozzles are aimed, but also when the nozzles are programmed to be activated at a particular time detected by the markers and scanners as described above. Tests have indicated that if a mist issued simultaneously from two nozzles interfere, there is a chance/risk that the mist particles will congregate and form drops, which is detrimental to the treatment of the items to be treated.

In a still further advantageous embodiment, at least one nozzle is directed radially towards the axis around which the turntable rotates and at least one nozzle is arranged at an oblique angle relative to the x-y plane.

In a still further advantageous embodiment, at least one elevated plateau is arranged above the turntable, the plateau also having a surface in the x-y plane, where the plateau is connected to the turntable such that the turntable and the plateau rotates in unison, and where the distance between the upper surface of the turntable and the underside of the plateau allows for items to be treated to be placed on the turntable. In this manner it becomes possible to arrange, for example a pair of shoes with one shoe on each level, i.e., one on the turntable and one on the plateau. For larger devices where the turntable has a substantial diameter, for example 40-60 centimeters, it may be possible to arrange two pairs of shoes, one on each level. Usually, additional nozzles, as compared to apparatus only having a turntable, will be arranged in order to carry out treatments for the items placed on the plateau and items placed on the turntable such that it is avoided to compromise the treatment by trying to have one nozzle providing an adequate treatment on both levels.

The plateau may also delimit the zone in which the mist is spread, such that a more concentrated mist is created in the treatment zone, i.e., between the surface of the turntable on which the shoes are placed and the underside of the plateau. In this manner it becomes easier to control the mist, the density of the mist and how much treatment liquid is present in the treatment zone.

In a still further embodiment of the invention, the preprogrammed sequence of activation of nozzles comprises sequences specific to various items to be treated, such that shoes will have one, two or more preprogrammed nozzle activation sequences, boots will have one, two or more preprogrammed nozzle activation sequences different from the preprogrammed nozzle activation sequences for shoes, and where gloves will have one, two or more preprogrammed nozzle activation sequences different from the preprogrammed nozzle activation sequences for shoes and boots, and where bags will have one, two or more preprogrammed nozzle activation sequences different from the pre-programmed nozzle activation sequences for shoes, boots and gloves, and where other items will have one, two or more preprogrammed nozzle activation sequences different from the preprogrammed nozzle activation sequences for shoes, boots, gloves, and bags.

Of course, with the facilities of having a turntable where the position of the turntable is identified at all times in combination with a control of the nozzles, it is possible to vary the treatment regime inside the treatment chamber according to the items which are to be treated. For example, shoes have many angels and shall need one treatment regime, whereas, for example a bag, may only have two major sides and two smaller sides, such that the treatment of a bag compared to shoes should be adapted.

With this embodiment it becomes possible to preprogrammed treatment regimens according to which types of items are to be treated with the apparatus. Also, for example if boots, gloves and bags are treated it may be possible to provide special support for these items in order to avoid blind spots as may arise if gloves are placed on the turntable. They will tend to have blocked major surface of the glove due to the engagement with the turntable. In these embodiments it might be contemplated to provide "model hands" on which the gloves are placed prior to being treated in the treatment chamber. Likewise with bags, supporters for bags, such that the bags are in a substantially upright position or in a position where only a very minor part of the bag is blocked by the turntable, may be used.

This is further improved in a further embodiment of the invention, where the relevant preprogramed nozzle activation sequences may be selected from an input unit provided on the outside of the apparatus, where optionally the input unit comprises a touch sensitive screen. By using a touch screen arranged on the outside of the apparatus a user can easily select the program, and thereby the treatment regime by the turntable and the nozzles, such that the preprogramed optimum treatment is carried out inside the treatment chamber.

In a further advantageous embodiment, a camera is provided inside the treatment chamber in order to recognize where an item to be treated is placed in the chamber, where the registration is used as input to the control unit, for controlling which nozzles are activated at which specific times or intervals. The camera will be able to recognize the position of the items to be treated relative to the cameras position and thereby in addition to the position of the turntable (i.e., the markers and the scanners) the camera will provide an optical recognition of the position and the type of items being placed on the turntable or plateau in order to be treated by the apparatus. Furthermore, the camera may also provide a control of successful treatment in that typically items being treated by for example impregnation liquid will tend to have wet zones immediately after treatment, and such the camera must be able to distinguish between a wet surface and a dry surface. This distinction will naturally indicate whether or not all surfaces of the item have been treated sufficiently.

In a further advantageous embodiment, the surface treatment may be varied from treatment to treatment by varying one or more of the following:

a. the rotation speed of the turntable;

b. the pressure in the nozzles;

c. the time duration in which the nozzles emit mist;

d. where more than one nozzle is provided in the treatment chamber deciding which nozzles are active at which time or time intervals.

Embodiments of the invention are also directed to a method of using an apparatus as described above. It is evident that the advantages already described above, with reference to the apparatus features, are all achieved with the method as well.

BRIEF DESCRIPTION

Figure 2:
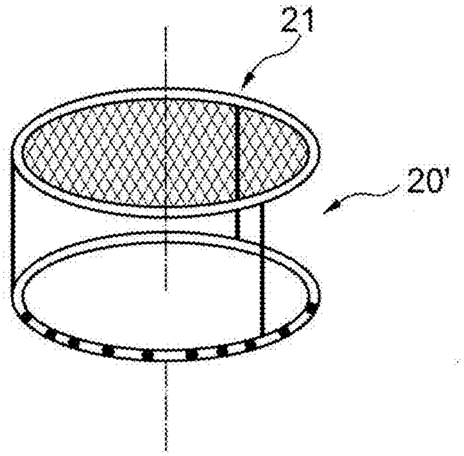

Some of the embodiments will be described in detail, with references to the following Figures, wherein like designations denote like members, wherein:

FIG. 1 illustrates a very schematic representation of some of the features of the apparatus; and FIG. 2 illustrates an embodiment of the turntable with a plateau.

DETAILED DESCRIPTION

In FIG. 1 a very schematic representation of some of the features of the apparatus according to embodiments of the present invention is illustrated. It shall be noted that FIG. 1 in no manner attempts to illustrate the actual practical apparatus but serves mainly to illustrate the novel and inventive features of the apparatus and the general principle of embodiments of the invention.

The apparatus 10 generally comprises a treatment chamber 12 arranged inside a housing 14. The housing in this embodiment comprises top, bottom and side walls, as well as a back wall. In the front of the device is provided an access door 16, such that by opening the door 16 access may be gained to the treatment chamber 12 in the interior of the apparatus 10.

In order to illustrate the various features of embodiments of the invention, the sides and doors have been illustrated as transparent, but in reality, they may be transparent or made from solid materials such as for example steel, plastics or the like. Inside the treatment chamber 12 is arranged a turntable 20, which has a surface in an x-y plane and may be brought to rotate about an axis orthogonal to the x-y plane i.e., parallel to a Z axis. Typically, the surface of the turntable 20 will be substantially horizontal, such that items placed on the turntable will remain on the turntable.

The periphery 22 of the turntable is provided with a plurality of markers substantially, evenly spaced around the periphery of the turntable 20. Adjacent the turntable 20 is arranged a scanner 26, which is able to detect and count/register the markers 24 as they pass in front of the scanner 26. In this manner it is impossible for a control unit 30 to determine the exact angular position of the turntable (and obviously also rotation speed etc). This is important in order to determine the exact position of the items to be treated, such that a preprogramed sequence of issuing of treatment agent may be determined.

Furthermore, inside the treatment chamber 18 are provided a number of nozzles. In this embodiment two nozzles 32, 32' are provided. The nozzles are arranged such that they will issue a mist towards the turntable 20, but not necessarily radially towards the axis of rotation Z of the turntable, but may also be arranged at an oblique angle, such that the mist will have a more or less tangent direction relative to the turntable 20. In this context it shall be noted that, the treatment agent issued by the nozzles 32, 32' will be in the shape of a mist, and therefore it is the general direction which is referred to when it is mentioned that the issuing direction is radial or not radial.

The scanner 26 as well as the nozzles 32, 32' are connected to the control box 30, such that the control box may activate the nozzles 32, 32', and may obtain input from the scanner 26. In this context it should be noted that, all piping necessary in order to supply treatment agent to the nozzles are not illustrated and neither are necessary pumps, reservoirs etc. The electrical connections 34, 36, 38 are all connecting the nozzles and scanners to the control box 30. Inside the control box 30 may be provided a variety of preprogramed treatment cycles depending on which type of item is to be treated inside the treatment chamber 12. In order to select the appropriate treatment program, the control box 30 is in this embodiment provided with a touch screen 40, such that a user easily may select the type of treatment for the type of item, such as for example shoes, boots, bags or gloves.

As already mentioned above, the items to be treated are positioned on the turntable. On the upper surface of the turntable 20 may be provided with indications of where to exactly place the items to be treated, such that the relationship between the items to be treated and the markers 24 on the periphery 22 of the turntable 20 are easily correlated, and therefore when the preprogramed sequence of the treatment is effectuated from the control box 30, the input received from the scanner 26 will help in determining which nozzles are to be activated at which times, in order to issue treatment agent at the correct times in the correct dosage in the correct direction, such that a more or less completely 100% treatment of the items to be treated, may be achieved as quickly as possible, and with as little treatment agent as possible.

A camera 44 may be provided inside the treatment chamber 12 in order to recognize where an item to be treated is placed in the chamber, wherein the registration is used as input to the control unit, for controlling which nozzles are activated at specific times or intervals.

Furthermore, a ventilator or fan 42 or other evacuation means may be provided, for evacuating any surplus airborne impregnation agent or water repellency agent or other treatment agent from the treatment chamber 12, before and/or during and/or after treatment with an impregnation agent or water repellency agent or other agent. The fan or ventilator 42 may comprise an integrated heating source. The ventilator and/or a fan and/or a heating source may be provided inside the treatment chamber for drying the treated items after treatment with an impregnation agent or water repellency agent or other agent.

In FIG. 2 a further embodiment of the turntable 20' is illustrated, where the turntable 20' has the surface comparable to the turntable's surface 20 in FIG. 1. Additionally, a plateau 21 is provided such that effectively two tiers are available to the user for placing items to be treated. Naturally, the distance in the Z direction between the surface of the turntable and the surface of the plateau must be large enough to accommodate the items which are to be treated.

Typically, in embodiments where two or more tiers are provided on the turntable a plurality of nozzles will be provided inside the treatment chamber in order to be able to treat items placed on any tier in a sufficiently effective manner. Naturally, the preprogrammed treatment cycles stored in the control box 30 will need to be programmed and selected by the user if items are provided on more than one tier.

The nozzles 32, 32' and any further nozzles (not illustrated with respect to this embodiment) may be activated sequentially, such that as one nozzle is issuing a mist of treatment agent towards the item to be treated the other nozzle is dormant and vice versa. It is also contemplated that some nozzles may be activated simultaneously in order to treat various areas of the items to be treated simultaneously. It has shown, however, that treatment mists issued from nozzles positioned at various locations inside the treatment chamber 12 may interfere and thereby hamper the proper treatment cycle of the items.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An apparatus for applying a surface treatment such as impregnation agent or water repellency agent to an item, wherein the apparatus comprises a closed treatment chamber provided with an openable access feature providing access to the treatment chamber from outside the treatment chamber, and wherein in the vicinity of the bottom of the treatment chamber a turntable is provided, the turntable having a flat surface in a x-y plane, and furthermore wherein the turntable is rotatable around an axis Z orthogonal to the x-y plane, and wherein one or more nozzles are arranged inside the treatment chamber directed for spraying a mist towards the turntable, wherein the one or more nozzles is/are connected to a control unit, wherein a plurality of markers are provided on the periphery of the turntable, wherein inside the treatment chamber a scanner for registering the markers is provided, and wherein input from the scanner is used as input to the control unit, such that the one or more nozzles are activated to issue a mist of treatment according to a preprogrammed sequence and/or count of markers registered by the scanner, wherein at least one elevated plateau is arranged above the turntable, the plateau also having a surface in the x-y plane, wherein the plateau is connected to the turntable such that the turntable and the plateau rotate in unison, and wherein a distance between the upper surface of the turntable and an underside of the plateau allows for items to be treated to be placed on the turntable.

2. The apparatus according to claim 1, wherein two or more nozzles are arranged inside the treatment chamber, wherein each nozzle is directed at different sections of the turntable.

3. The apparatus according to claim 1, wherein at least one nozzle is directed radially towards the axis around which the turntable rotates and at least one nozzle is arranged at an oblique angle relative to the x-y plane.

4. The apparatus according to claim 1, wherein the treatment chamber has a size allowing items to be treated to be arranged both on the turntable and on an upper surface of the plateau.

5. The apparatus according to claim 1, wherein the preprogrammed sequence of activation of nozzles comprises sequences specific to various items to be treated such that shoes will have one, two or more preprogrammed nozzle activation sequences, boots will have one, two or more preprogrammed nozzle activation sequences different from the preprogrammed nozzle activation sequences for shoes, and wherein gloves will have one, two or more preprogrammed nozzle activation sequences different from the preprogrammed nozzle activation sequences for shoes and boots, and wherein bags will have one, two or more preprogrammed nozzle activation sequences different from the preprogrammed nozzle activation sequences for shoes, boots and gloves, and wherein other items will have one, two or more preprogrammed nozzle activation sequences different from the preprogrammed nozzle activation sequences for shoes, boots, gloves, and bags.

6. The apparatus according to claim 5, wherein the relevant preprogrammed nozzle activation sequences may be selected from an input unit provided on the outside of the apparatus, wherein optionally the input unit comprises a touch sensitive screen.

7. The apparatus according to claim 1, wherein a camera is provided inside the treatment chamber in order to recognize where an item to be treated is placed in the chamber, wherein the registration is used as input to the control unit, for controlling which nozzles are activated at which specific times or intervals.

8. The apparatus according to claim 1, wherein the surface treatment may be varied from treatment to treatment by varying one or more of the following:

a. the rotation speed of the turntable;
b. the pressure in the nozzles;
c. the time duration in which the nozzles emit mist; and
d. wherein more than one nozzle is provided in the treatment chamber deciding which nozzles are active at which time or time intervals.

9. The apparatus according to claim 1, wherein a fan or other evacuation means are provided, for evacuating any surplus airborne impregnation agent or water repellency agent or other treatment agent from the treatment chamber, before and/or during and/or after treatment with an impregnation agent or water repellency agent or other agent.

10. The apparatus according to claim 1, wherein a ventilator and/or a fan and/or a heating source is provided inside the treatment chamber for drying the treated items after treatment with an impregnation agent or water repellency agent or other agent.

11. A method of using an apparatus according to claim 1, wherein an item or items to be treated is/are positioned on the turntable and/or the elevated plateau, after which the access to the treatment chamber is closed and a pre-programmed treatment program is selected, wherein the program at least comprises:

a. rotating the item to be impregnated on the turntable, and registering the position of the turntable;
b. issuing a mist of treatment agent from the one or more nozzles towards the item to be treated, as the item is rotated;
c. after a part of the treatment program comprising issuing treatment agent from the one or more nozzles has been completed;
d. a drying cycle is initiated while maintaining rotation of the turntable; and wherein after the access to the treatment chamber is opened and the item(s) now treated is/are removed.

12. An apparatus for applying a surface treatment to an item, the apparatus comprising:

a treatment chamber with an openable access feature providing access to the treatment chamber from outside the treatment chamber, a turntable provided in the vicinity of a bottom of the treatment chamber, the turntable having a flat surface in a x-y plane and being rotatable around an axis Z orthogonal to the x-y plane, wherein a plurality of markers are provided on the periphery of the turntable, a nozzle arranged inside the treatment chamber directed for spraying a mist towards the turntable, where the nozzle is connected to a control unit, a scanner for registering the plurality of markers inside the treatment chamber, wherein information from the scanner is used as input to the control unit, such that the nozzle is activated to issue a mist of treatment according to a preprogrammed sequence and/or count of the plurality of markers registered by the scanner, and at least one elevated plateau arranged above the turntable, the elevated plateau having a second surface in the x-y plane, wherein the elevated plateau is connected to the turntable such that the turntable and the plateau rotate in unison, and wherein a distance between the upper surface of the turntable and an underside of the plateau allows for items to be treated to be placed on the turntable.

13. The apparatus according to claim 12, wherein two or more nozzles are arranged inside the treatment chamber, wherein each nozzle is directed at different sections of the turntable.

14. The apparatus according to claim 12, wherein at least one nozzle is directed radially towards the axis around which the turntable rotates and at least one nozzle is arranged at an oblique angle relative to the x-y plane.

15. The apparatus according to claim 12, wherein the treatment chamber has a size allowing items to be treated to be arranged both on the turntable and on an upper surface of the elevated plateau.

16. The apparatus according to claim 12, wherein the preprogrammed sequence of activation of nozzles comprises sequences specific to various items to be treated and/or wherein relevant preprogrammed nozzle activation sequences may be selected from an input unit.

17. The apparatus according to claim 12, wherein a camera is provided inside the treatment chamber in order to recognize where an item to be treated is placed in the chamber, wherein the registration is used as input to the control unit, for controlling which nozzles are activated at which specific times or intervals.

18. The apparatus according to claim 12, wherein the surface treatment may be varied from treatment to treatment by varying one or more of the following:

a. the rotation speed of the turntable;

b. the pressure in the nozzles;

c. the time duration in which the nozzles emit mist; and d. wherein more than one nozzle is provided in the treatment chamber deciding which nozzles are active at which time or time intervals.

19. The apparatus according to claim 12, wherein a fan or other evacuation means are provided, for evacuating any surplus treatment agent from the treatment chamber, before and/or during and/or after treatment, and/or wherein a ventilator and/or a fan and/or a heating source is provided inside the treatment chamber for drying the treated items after treatment.

* * * * *